Aug. 7, 1951     A. A. McCORMACK     2,563,610
SELF-SEALING AUTOMATICALLY LUBRICATED SPINDLE
Filed June 20, 1947
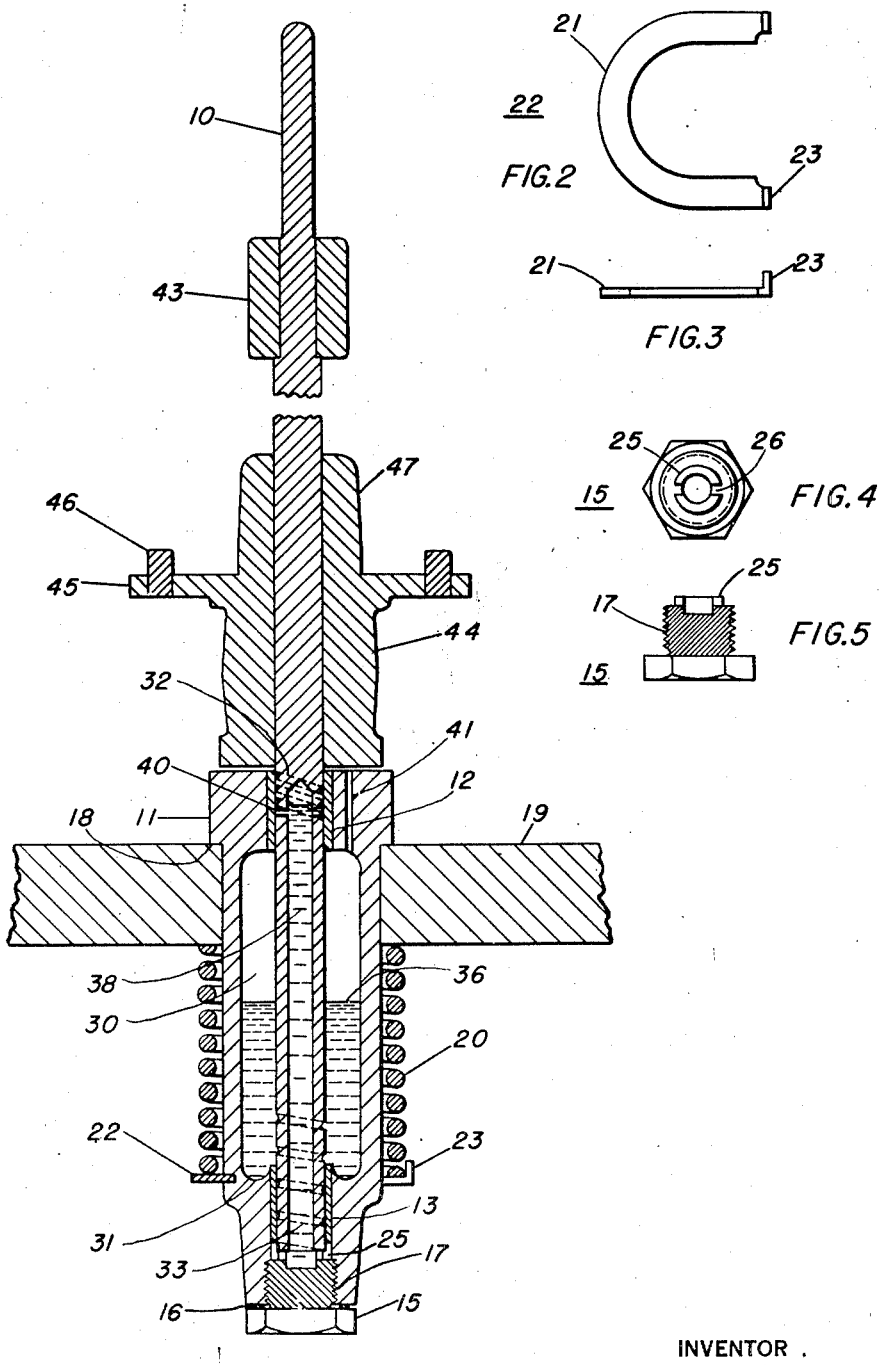
INVENTOR.
ALEX A. McCORMACK
BY
ATTORNEY Patented Aug. 7, 1951

2,563,610

UNITED STATES PATENT OFFICE 2,563,610

SELF-SEALING AUTOMATICALLY LUBRICATED SPINDLE

Alex A. McCormack, Dayton, Ohio, assignor to Industrial Rayon Corporation, Cleveland, Ohio, a corporation of Delaware Application June 20, 1947, Serial No. 755,950

4 Claims. (Cl. 308—169)

This invention relates to spindles and, more particularly, to self-sealing and automatically lubricated high speed textile spindles.

Modern textile operations call for high spindle speeds on twisting, doubling and spinning machines. The increase in spindle speeds of textile machines has brought with it the problem for providing adequate spindle bearing lubrication and a spindle lubricant sealing means. Generally, textile spindles are lubricated by means of lubricant holding cups whose outlets are threaded into a spindle bolster case adjacent the spindle bearings; or the bolster case may serve as a reservoir for the lubricant and the spindle may have external grooves which act as a pumping means for externally forcing the lubricant through improvised passages to the spindle bearings.

The above lubricating means have been found not to be entirely satisfactory, for, while initially there may have been enough lubricant for the spindle, eventually it became lost because of the lack of a positive lubricant seal and its distribution to the various spindle bearings soon proved inadequate. The lost lubricant was, generally, thrown away by the spindle onto adjacent equipment, yarn supplies, and onto the floor. Greasy and oily equipment, and floors were the result. Obviously such a condition is not desirable since it increases the working risks for the people in attendance of the machines. The possibility of fire is also increased; and, of course, maintenance costs become higher due to a more frequent replacement of unlubricated, worn out bearings and spindles.

Attempts have been made to reduce the loss of lubricant through the use of oil deflectors and various types of packings. However, they have not proved entirely successful. This invention advantageously provides a self-sealing, automatically lubricated spindle. Generally, the invention comprises a spindle having a hollow portion within the bolster case. The spindle is adapted to rotate between spaced bushings and rests on an open load bearing positioned in the bottom of the bolster case which also serves as a lubricant reservoir. Further, the base portion of the spindle is provided with a pumping device, such as a grooved periphery, and with a second pumping device on that portion of the spindle that is within the upper spindle bearing. Radial passages are provided in the spindle joining the hollow interior with the upper spaced bushing. The bottom grooves, then, are adapted to pump the lubricant from the bolster case reservoir through the open load bearing into the hollow portion of the spindle then through the radial outlets into the upper spindle bearing. The lubricant is prevented from rising above the upper spaced bearing by the upper pump which is adapted to redirect it in a downward direction.

The automatically lubricated spindle with its integral sealing means will be described in greater detail in the following specification and drawing, where:

Figure 1 represents in sectional elevation the spindle of this invention;

Figures 2 and 3 represent plan and elevational views of a locking device utilized in holding the bolster case of the spindle in a spindle rail; and Figures 4 and 5 represent in plan and elevation a spindle load or normal bearing that is utilized in supporting the spindle.

In the embodiment illustrated in Figure 1 of the drawing, a spindle 10 is adapted to rotatably support by means of aligning hubs 43, 47 and a flange 45 a spool of thread or the like. The spindle 10 is adapted to be rotated by whorl 44. Further, the spool or bobbin (not shown) is prevented from slipping on the flange 45 by the pins 46 which are adapted to fit into receiving recesses in the bottom flange of the spool.

The spindle blade 10 rotates in the bolster case 11 between the spaced vertical bearings 12 and 13. It rests on a normal or load bearing 25 positioned in the bottom of the bolster case 11. Advantageously, the sleeve bearings 12 and 13, as shown, are bushing type bearings. The load bearing 25 which supports the spindle forms a part of a stud 15. The stud has a threaded screw portion 17 which is adapted to be turned into the base of the bolster 11. Further, the load bearing 25 has a diametrically cut opening 26 for the flow of a lubricant therethrough to the interior of the spindle, as will be hereinafter described. A sealing washer 16 is desirably interposed between the stud 15 and the bolster case 11.

The spindle blade 10 is provided with a lower pumping means such as the helical grooves 33 which advantageously extend from the interior of the bolster case through the lower bushing bearing 13. When the spindle rotates the helical grooves 33 act in a manner similar to a screw pump to force the lubricant 36 through the bearing 13 and through the loading bearing 25 into the spindle interior for a purpose which will be hereinafter described.

The lower portion of the spindle blade 10, i. e., substantially that section that is within the bolster case is bored out to form a passage 38 which extends upwardly to within the upper bearing 12. At substantially the upper terminus of the hollow passage 38, there are provided radial passages 40 in the spindle blade sides which extend to the inner surface of the upper bearing 12. Further, the spindle within the bearing 12 is provided with a pumping device similar to that described in connection with the lower section of the spindle. The spindle is helically cut to form grooves 32. The grooves 32 act as a screw pump and tend to seal off the upper portion of the spindle 10 by pumping the lubricant back into the interior of the bolster case. Thus, while the lower grooves 33 are adapted to pump the lubricant 36 through the spindle bearings, the upper grooves 32 pump it back again into the reservoir. To facilitate the circulation of the lubricant, the lower end of the spindle blade 10 which rests on the load bearing 25 is advantageously squared and the split load bearing 25, as shown in Figures 4 and 5, is also squared to provide a matching bearing surface for the spindle.

The load bearing 25 is shown as being a circular bearing cut diametrically to provide an opening 26 for the flow of the lubricant into the interior 38 of the spindle. However, instead of a circular squared surface bearing, as shown, a ball type bearing with radial openings may be utilized between the spindle end and the stud 15. Further, other suitable types of load bearings can be used so long as entries are provided in them for the flow of the lubricant into the hollow interior 38 of the spindle blade 10.

The bolster case 11 which holds the spindle 10 is adapted to be mounted in a spindle rail 19 resting therein on its shoulder 18. It is held in position by means of a compression spring 20, one end of which bears against the spindle rail 19, while the other end bears against a U-shaped retaining washer 22. The washer 22 is adapted to be slipped into an annular groove provided for it in the periphery of the bolster case 11. The bolster case 11 is, further, utilized as a reservoir 30 for the lubricant 36. The reservoir 30 is vented to the atmosphere through passage 41.

The spring retaining washer 22 is of the type shown in Figures 2 and 3. It is advantageously made of a U-shaped section 21 having turned up ends 23 which, when in position, bear against the spring 20 and thus prevent the washer from slipping out of position. Further, the inside portion of the ends 23 are partially cut away in order to avoid any interference with the bolster case when the washer is inserted into the groove that is provided for it. The washer 22 is initially placed into position upon a compression of the spring 20 against the spindle rail 19. When the retaining washer 22 is in position the spring 20 is then released to bear against it and the spindle rail 19. This simple method of supporting the bolster case 11 also desirably provides for a damping means which absorbs the vibration sometimes caused by the eccentricity of a rotating spindle.

I claim:

1. A self-sealing automatically lubricated high speed spindle comprising, a bolster case having an interior that is adapted as a lubricant reservoir, spaced bearings positioned in said bolster case, a spindle positioned in said spaced bearings, said spindle being hollow for substantially the distance between said spaced bearings, at least one radial passage in said spindle joining said hollow spindle interior and one of said spaced bearings, lubricant pumping means associated with the lower portion of said spindle being adapted to force a lubricant through one of said spaced bearings through said radial passage, and a second lubricant pumping means being associated with said spindle and within said other spaced bearing and being above said radial passage, said second pumping means being adapted to act as a seal and to force said lubricant back into said lubricant reservoir.

2. A self-sealing automatically lubricated high speed spindle comprising, a bolster case having an interior that is adapted as a lubricant reservoir, spaced bearings positioned in substantially each end of said bolster case, a spindle positioned in said spaced bearings, said spindle being hollow for substantially the length between said spaced bearings, at least one radial passage in said spindle joining said hollow spindle interior and one of said spaced bearings, a screw-type pump being associated with said spindle at its lower portion, said pump being adapted to circulate the lubricant from the bolster case reservoir through one of said spaced bearings into the hollow interior of the spindle, thence through said radial passage to said other spaced bearing, and a second screw-type pump on said spindle and within the other spaced bearing and being above said radial passage, said second pump being adapted to act as a seal and to force the return of said lubricant to said lubricant reservoir.

3. A self-sealing automatically lubricated high speed spindle comprising, a bolster case having an interior that is adapted as a lubricant reservoir, a lower and an upper vertical bearing in substantially each end of said bolster case, a load bearing in the base of said bolster case, a spindle adapted for rotation positioned in said vertical bearings and resting on said load bearing, said spindle being hollow from its base end to substantially within said upper vertical bearing, at least one radial passage in said spindle from said hollow interior to its exterior and within that portion of the spindle rotating in said upper bearing, peripheral helical grooves on the lower portion of said spindle extending from within said reservoir through said lower bearing to the spindle end, and second peripheral helical grooves substantially within the upper vertical bearing and extending above said radial passage, said lower grooves being adapted to pump the lubricant from the reservoir through the lower vertical bearing into the hollow portion of the spindle and out therefrom through the radial passage to lubricate the upper vertical bearing and said upper helical grooves being adapted to act as a seal and for effecting the continuous circulation of the lubricant from said radial passage back into said bolster reservoir.

4. A self-sealing automatically lubricated high speed spindle comprising, a vented bolster case having an interior that is adapted as a lubricant reservoir, a lower and an upper vertical bearing in substantially each end of said bolster case, a load bearing in the base of said bolster case having an opening for the passage of a lubricant therethrough, a spindle adapted for rotation positioned in said spaced vertical bearings and resting on said load bearing, at least one radial passage in said spindle joining said hollow interior and said upper bearing, helical grooves in the lower periphery of said spindle, said grooves extending from within the reservoir through said lower bearing to the spindle end, helical grooves in the spindle periphery substantially within the upper vertical bearing and being above said radial passage, said lower helical grooves being adapted to pump a continuous unimpeded flow of lubricant from said reservoir through said lower vertical bearing and through the load bearing into the hollow unobstructed interior of the spindle thence through said radial passage in said spindle to said upper vertical bearing, said upper helical grooves being adapted to act as a seal and for effecting a continuous unobstructed circulation of the lubricant from said radial passage back into said reservoir.

ALEX A. McCORMACK.

REFERENCES CITED

The following references are of record in the file of this patent:

UNITED STATES PATENTS

| Number | Name | Date |
|---|---|---|
| 1,484,525 | Noeggerath | Feb. 19, 1924 |
| 1,679,199 | Baker | July 31, 1928 |
| 1,837,020 | Defibaugh | Dec. 15, 1931 |
| 1,928,525 | Etheridge | Sept. 26, 1933 |